United States Patent
Minami

(10) Patent No.: US 6,909,433 B2
(45) Date of Patent: Jun. 21, 2005

(54) IMAGE DISPLAY APPARATUS AND IMAGE DISPLAY METHOD

(75) Inventor: Toshiaki Minami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 101 days.

(21) Appl. No.: 10/327,186

(22) Filed: Dec. 24, 2002

(65) Prior Publication Data

US 2003/0117407 A1 Jun. 26, 2003

(30) Foreign Application Priority Data

Dec. 25, 2001 (JP) .......................................... 2001-392638
Nov. 18, 2002 (JP) .......................................... 2002-334214

(51) Int. Cl.$^7$ ............................. G06F 13/00; G06T 9/00
(52) U.S. Cl. ........................ 345/536; 345/537; 345/555; 345/688; 345/156; 345/162
(58) Field of Search ................................ 345/619, 660, 345/661, 670, 671, 684, 688, 686–687, 472, 472.2, 798, 800, 801, 815, 822–823, 536, 537, 541, 543, 547, 555, 574, 156–158, 160, 162, 784–788; 358/1.1, 1.2, 1.9, 1.16

(56) References Cited

U.S. PATENT DOCUMENTS 5,526,137 A * 6/1996 Nameki ...................... 358/406
6,094,510 A * 7/2000 Yaguchi et al. ............. 382/232
6,281,983 B1 * 8/2001 Takahashi et al. ........... 358/1.2

* cited by examiner

Primary Examiner—Matthew C. Bella
Assistant Examiner—Wesner Sajous
(74) Attorney, Agent, or Firm—Fitzpatrick, Cella, Harper & Scinto

(57) ABSTRACT

Image display apparatus and image display method which realize smooth scroll-display of image data and enlargement/reduction display, and attain cost reduction by reducing the capacity of local memory for temporarily storing image data. In the image display apparatus, compressed image data is stored in an image memory 52, and partial image data of the compressed image data within a display range of monitor screen 56 and its peripheral compressed image data are transferred to a local image memory 59. in the local image memory 59, the partial image data and the peripheral image data are expanded and stored. Further, compressed image data further surrounding these data is stored. Then, compressed image data in a designated scroll direction is expanded by an image expansion unit 60.

18 Claims, 14 Drawing Sheets

FIG. 6
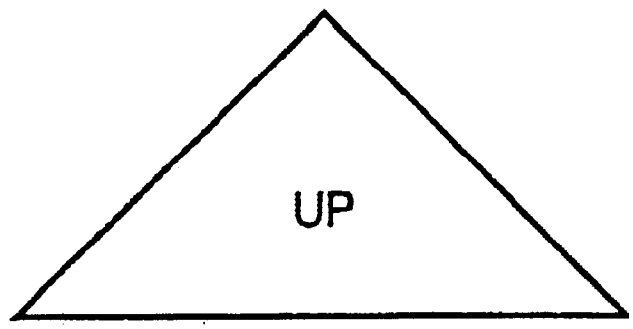
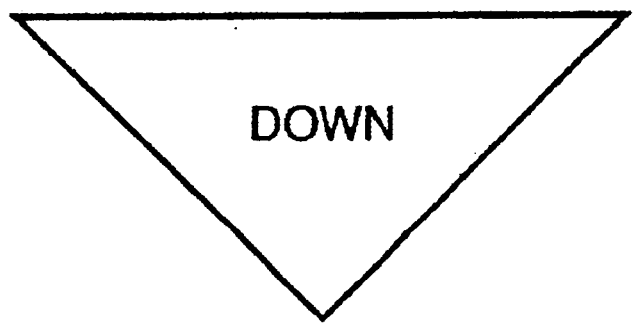

IMAGE DISPLAY APPARATUS AND IMAGE DISPLAY METHOD

FIELD OF THE INVENTION

The present invention relates to image display apparatus and image display method for a preview of image to be printed prior to printing.

BACKGROUND OF THE INVENTION

In print processing based on image data by using a digital copier, a printer or the like, in some cases, it is desired that a preview of image to be printed is displayed on a monitor screen to check whether or not the result of printing that was intended can be obtained. FIG. 12 is a block diagram showing the construction of image display apparatus having a function of presenting a preview of image data prior to printing.

In the conventional display apparatus in FIG. 12, an image read from a hard disk (HD) 102 or a scanner 103 is inputted into a controller 110 via an HD I/F 107 or scanner I/F 108 of a printer interface (I/F) board 101. For the sake of conservation of memory capacity, the input image is compressed by an image compression unit 114 included in the controller 110 and stored into an image memory 113.

Further, when the image data inputted into the image memory 113 is print-outputted, the data is expanded by an image expansion unit 115 included in the controller 110, outputted to a printer 104 via a printer I/F 109, and print-outputted.

On the other hand, in a case where the image data is previewed prior to printing, the image data is expanded by the image expansion unit 115 included in the controller 110, and outputted to a monitor screen 105 via a monitor I/F 112. Note that instructions for the above-described printing and preview are made by a user from an operation unit 106, and various instruction information are sent to the controller 110 via an operation I/F 111.

In a case where a preview image is displayed on a monitor screen 105, in some cases, it is desired that not only the entire image but also to an enlarged image part is displayed so as to check details of the image to be printed. Further, to check an enlarged image part, it is desired to check the image in a wide range while scrolling the image displayed on the monitor screen 105.

To satisfy such requirements, it is necessary to provide the image display apparatus having the above construction with means for enlargement and reduction of image and means for scrolling an image display area and in this case, the production cost of the apparatus as a product increases. Accordingly, the above-described image preview function may be installed in the image display apparatus as another board or LSI, and the controller is arranged such that the function can be added in correspondence with product specification.

FIG. 13 is a block diagram showing the construction of the image display apparatus shown in FIG. 12, to which means for realizing a preview function including an image enlargement/reduction function and scroll function is connected as another board. In the image display apparatus shown in FIG. 13, an image stored in an image memory 132 is displayed as a preview image on a monitor screen 136 based on an instruction from an operation input unit 126. In this case, first, the entire image is expanded by an image expansion unit 134 included in a controller 130 and temporarily stored in the image memory 132. Then only an image part necessary for display on the monitor screen 136 is transferred to a local image memory 139 connected to a preview board 121.

Next, the image data is converted by an image enlargement/reduction unit 137 on the preview board 121 into image data at a scale designated from the operation input unit 126. Further, the data is converted by a color space converter 138 into data having color components and image data format appropriate to screen display. The converted image data is stored into an image buffer in the local image memory 139. Then, a monitor I/F 135 sequentially reads the image data from an image display area within the image buffer and outputs the data to a monitor screen 136.

Further, in a case where an instruction to scroll the image displayed on the monitor screen 136 is inputted from the operation input unit 126, similarly, newly-required image data within a range necessary for display is sequentially transferred to the local image memory 139 connected to the preview board 121. Thereafter, the image data is converted by the image enlargement/reduction unit to image data at a designated scaling designated 137, and converted by the color space converter 138 to data having color components and image data format appropriate to image display. Then, the converted image data is stored into the image buffer area in the local image memory 139 thereby image scroll is realized. Note that if the image buffer area is used as a ring buffer, a newly stored image is written over an image area which disappears from the display screen by scroll.

Further, in the image display apparatus as shown in FIG. 13, it may be arranged such that the local image memory 139 has a sufficiently large size and the entire enlarged image data can be stored in addition to image data in a necessary range. In this image display apparatus, to display a preview image in accordance with an instruction from the operation input unit 126, first, the entire image is expanded by the image expansion unit 134 included in the controller 130, then transferred to the local image memory 139 connected to the preview board 121. Next, the image data is converted by the image enlargement/reduction unit 137 to an image at a designated scaling, and converted by the color space converter 138 to image data having color components and image data format appropriate to screen display. Then the converted image data is stored into the image buffer area connected to the local image memory 139.

The monitor I/F 135 sequentially reads the image data from the image display area in the image buffer area and outputs the data to the monitor screen. Further, if an instruction for screen scroll is inputted from the operation unit 126, the image display area is sequentially changed by using display area scroll means provided in the monitor I/F 135, thereby the image displayed on the monitor screen 136 is scrolled.

However, in the example of FIG. 13, in the former case of image display apparatus where necessary image data is sequentially transferred to the local image memory 139, as it takes time from the instruction for image scroll before the image display, image scroll cannot be smoothly performed. Further, in the case of image display apparatus where the entire image data is stored in the local image memory 139, although smooth scroll is realized, a memory capacity for storing enlarged image data is necessary, accordingly, the product cost increases.

Further, in any of the arrangements, it is necessary to previously expand the entire image. It takes time to perform the expansion processing, and further, as the expanded image data is non-compressed data, much time is required for transfer of the image data from the image memory to the local image memory.

SUMMARY OF THE INVENTION

The present invention has been proposed to solve the conventional problems, and has its object to provide image display apparatus and image display method which realize smooth scroll display and enlargement/reduction display of image data, and attain cost reduction by reducing the capacity of local image memory for temporarily storing image data to be displayed on a monitor screen.

According to the present invention, the foregoing object is attained by providing an image display apparatus comprising: first storage means for storing image data in compressed form; first designation means for designating partial image data to be screen-displayed from the image data; second storage means for storing the partial image data designated by the first designation means and peripheral data of the partial image data in compressed form; expansion means for expanding the partial image data and the peripheral data stored in compressed form in the second storage means; third storage means for storing the partial image data and the peripheral data expanded by the expansion means; screen-display means for screen-displaying the partial image data stored in the third storage means; second designation means for designating partial image data to be screen-displayed next; prediction means for predicting necessity of required image data, being peripheral data of the partial image data designated by the second designation means, and not stored in the second storage means; and transfer means for, in accordance with the result of prediction by the prediction means, reading the required image data from the image data stored in the first storage means and transferring the image data to the second storage means.

Further, according to the present invention, the foregoing object is attained by providing an image display method using first storage means, second storage means and third storage means for storing image data, comprising the steps of: designating partial image data to be screen-displayed from the image data stored in the first storage means in compressed form; storing the designated partial image data and peripheral data of the partial image data into the second storage means in compressed form; expanding the partial image data and the peripheral data stored in the second storage means in compressed form; storing the expanded partial image data and the peripheral data into the third storage means; screen-displaying the partial image data stored in the third storage means; designating partial image data to be screen-displayed next; predicting necessity of required image data, being peripheral data of the designated partial image data, and not stored in the second storage means; and reading the required image data from the image data stored in the first storage means and transferring the required image data to the second storage means in accordance with the result of prediction.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of scaling designation buttons;

DETAILED DESCRIPTION OF THE PREFERRED EMBODIMENTS

Preferred embodiments of the present invention will now be described in detail in accordance with the accompanying drawings.

<First Embodiment>

Figure 1:
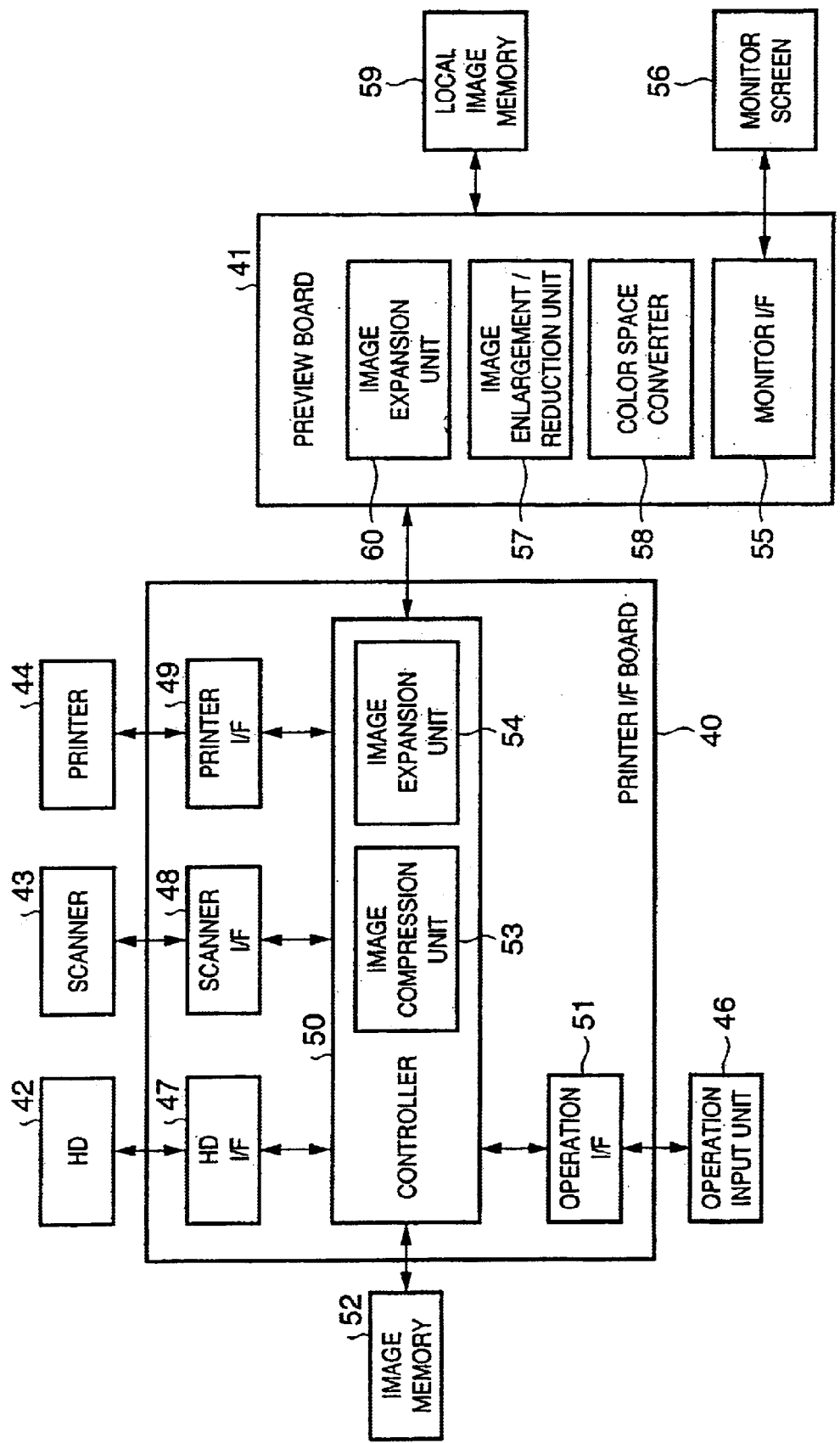
FIG. 1 is a block diagram showing the construction of image display apparatus according to a first embodiment of the present invention.

FIG. 1 is a block diagram showing the construction of image display apparatus according to a first embodiment of the present invention. As shown in FIG. 1, the image display apparatus is connected to a hard disk (HD) 42 holding image data via an HD interface (I/F) 47, connected to a scanner 43 for reading image data via a scanner I/F 48, and connected to a printer 44 for print-outputting image data via a printer I/F 49, and connected to an operation input unit 46 for instruction for printing and scroll display of image data via an operation I/F 51.

Further, on printer interface board 40, these I/Fs are connected to a controller 50 which controls printing of image data and controls display. Further, the controller 50 is connected to an image memory 52 for storing input image data and a preview board 41 for various control for preview of image data. The preview board 41 is connected to a local image memory 59 for storing image data to be previewed prior to printing and a monitor screen 56 which displays image data.

Further, the controller 50 includes an image compression unit 53 which compresses input image data and an image expansion unit 54 which expands compressed image data. On the other hand, the preview board 41 includes an image expansion unit 60 which expands compressed image data, an image enlargement/reduction unit 57 which further enlarges or reduces expanded image data, a color space converter 58 which performs color conversion or the like on image data, and a monitor I/F 55 for connection with the monitor screen 56. Note that the preview board 41 is provided with a controller (not shown) which controls respective operations of the image expansion unit 60, the image enlargement/reduction unit 57, the color space converter 58 and the monitor I/F 55.

Next, image data used in the present embodiment will be described. The image data stored in the image memory 52 is color image data of respective 8-bit C (cyan), M (magenta) and Y (yellow) data, and is compressed by a JPEG method. Note that the image data is divided into blocks of 32 pixels×32 pixels, and JPEG-compressed by block. Accordingly, it is possible to extract a particular image part and transfer or expand it. Further, the position of compressed data of each image part in the entire image is managed by a list table stored in another area in the image memory 52.

Figure 2:
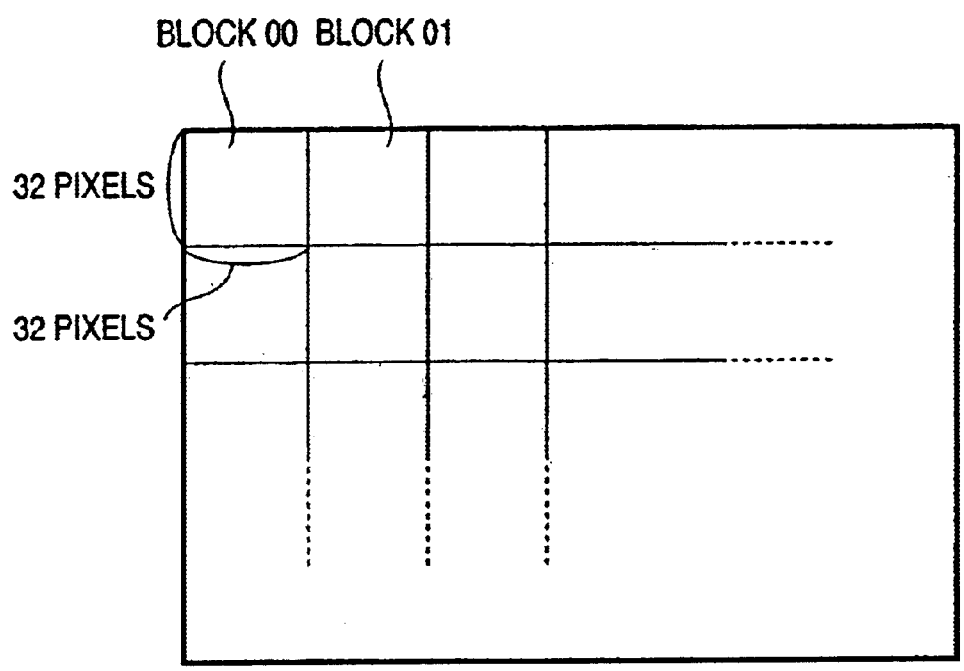
FIG. 2 is an example of image data divided into plural blocks.
Figure 3:
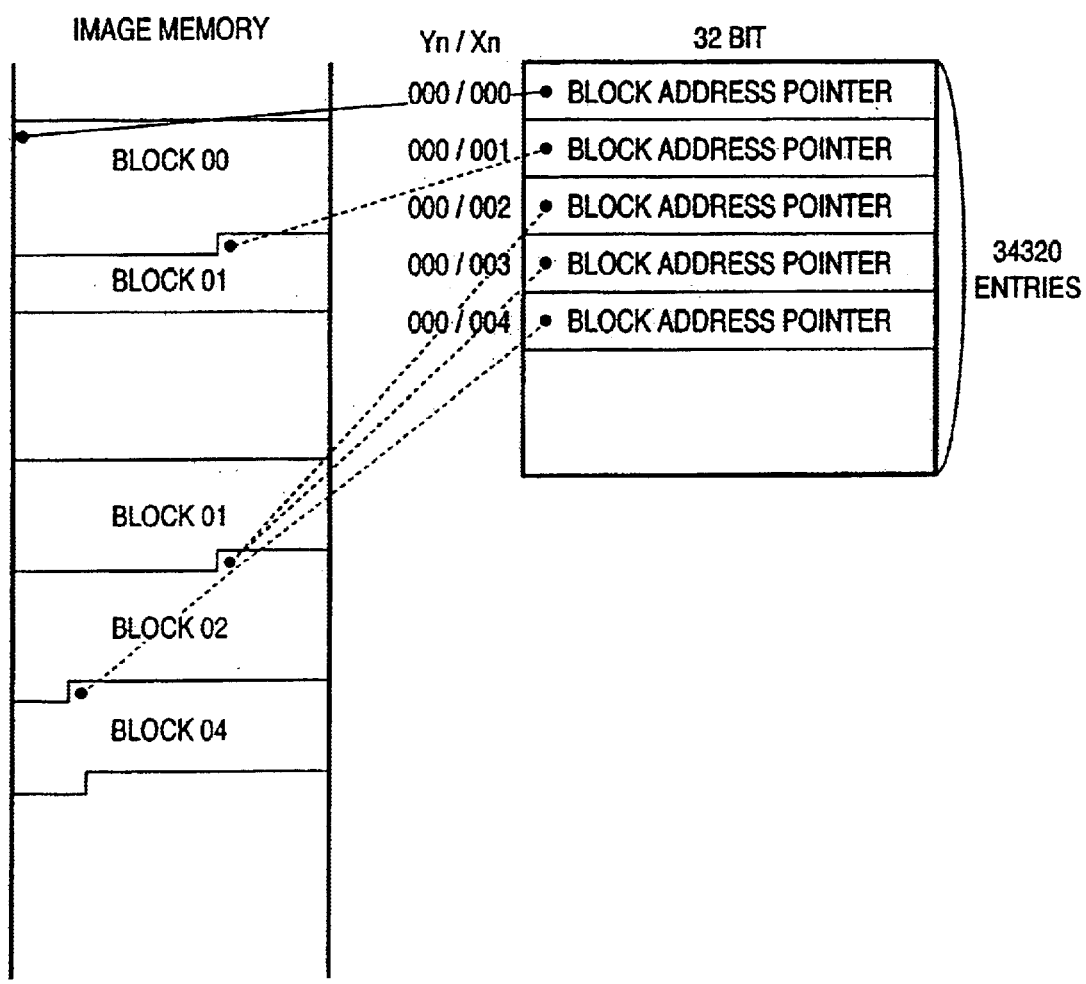
FIG. 3 is an explanatory view of example of list table according to the first embodiment.

For example, if the image data represents a 600 dpi A4 sized image, assuming that 1 block has 32 pixels×32 pixels, the image is divided into 34320 blocks. FIG. 2 shows an example where the image data is divided into plural blocks. FIG. 3 is an explanatory view of example of the list table according to the first embodiment. As shown in FIG. 3, the list table holds 34320 entries, with the positions in the horizontal and vertical directions in 32 pixel units as indexes, holds head addresses of compressed image data in the positions. The compressed image data in a desired position is read by referring to the list table.

Figure 4:
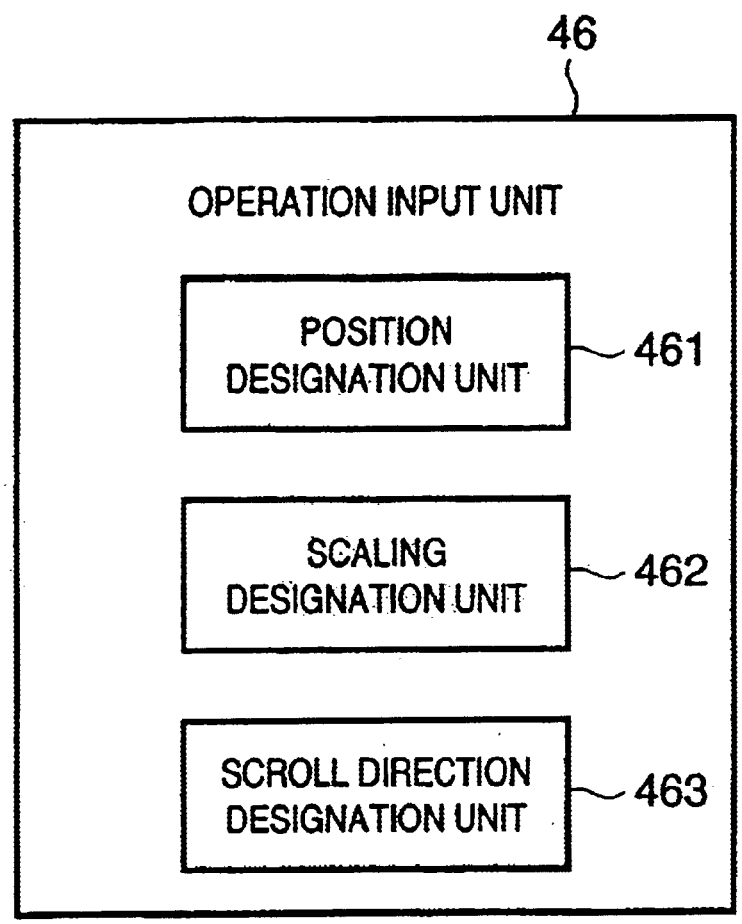
FIG. 4 is block diagram showing the detailed construction of operation input unit 46.
Figure 5:
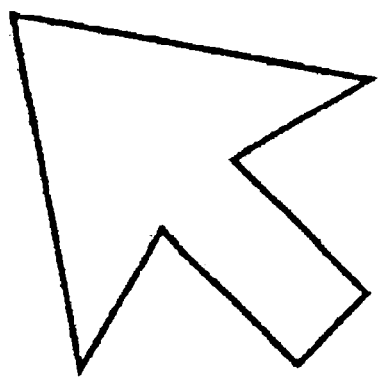
FIG. 5 is an example of pointer which is displayed on a monitor screen 56 and which moves on the monitor screen.

Next, the operation input unit 46 will be described in detail. FIG. 4 is block diagram showing the detailed construction of the operation input unit 46. The operation input unit 46 has a position designation unit 461 for designation of image position, a scaling designation unit 462, and a scroll direction designation unit 463. Further, FIG. 5 is an example of pointer which is displayed on a monitor screen 56 and which moves on the monitor screen. Upon user's operation input such as depression of button or the like, the position designation unit 461 detects the position of the pointer displayed as an arrow-shape pointer on the screen as shown in FIG. 5 as a designated position.

Further, the scaling designation unit 462 has means for designating a display scaling value on the screen by the user. FIG. 6 is an example of scaling designation buttons. The operation status by the user's depression of enlarge (UP) button or reduction (DOWN) button as shown in FIG. 6 is detected, and a numerical value is displayed on the screen.

Figure 7:
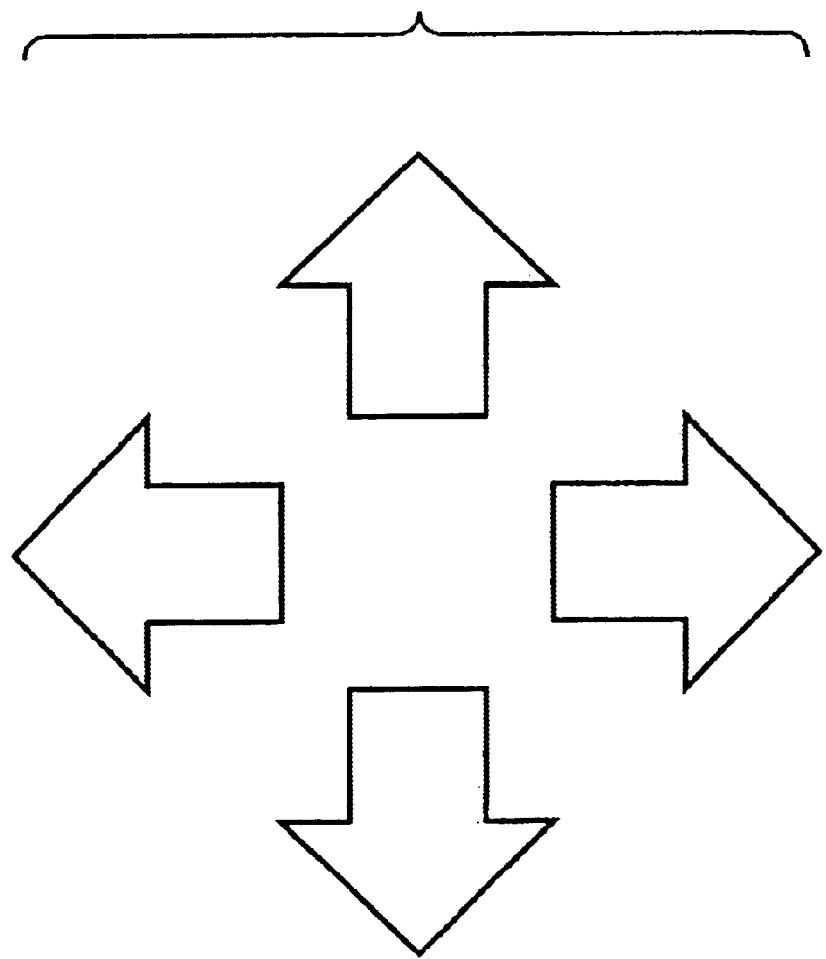
FIG. 7 is an example of arrow buttons for designation of scroll direction.

FIG. 7 is an example of arrow buttons for designation of scroll direction. The scroll direction designation unit 463 detects the user's depression of one of frontward/rearward/leftward/rightward arrow buttons as shown in FIG. 7, and designates the desired scroll direction.

For example, the scaling designation unit 462 designates 1.0 screen display scaling and an instruction to display a central part of image on the monitor screen 56 is made, the size of the image displayed on the monitor screen 56 is 480 pixels×320 pixels, and the resolution is 75 dpi. In this case, compressed image data necessary for screen display has $(480 \div 32 \times (600 \div 75) \div 1.0) \times (320 \div 32 \times (600 \div 75) \div 1.0) = 2400$ blocks. Accordingly, to display the designated image data on the monitor screen 56, image data for 2400 blocks is transferred from the image memory 52 to the local image memory 59 of the preview board 41.

Figure 8:
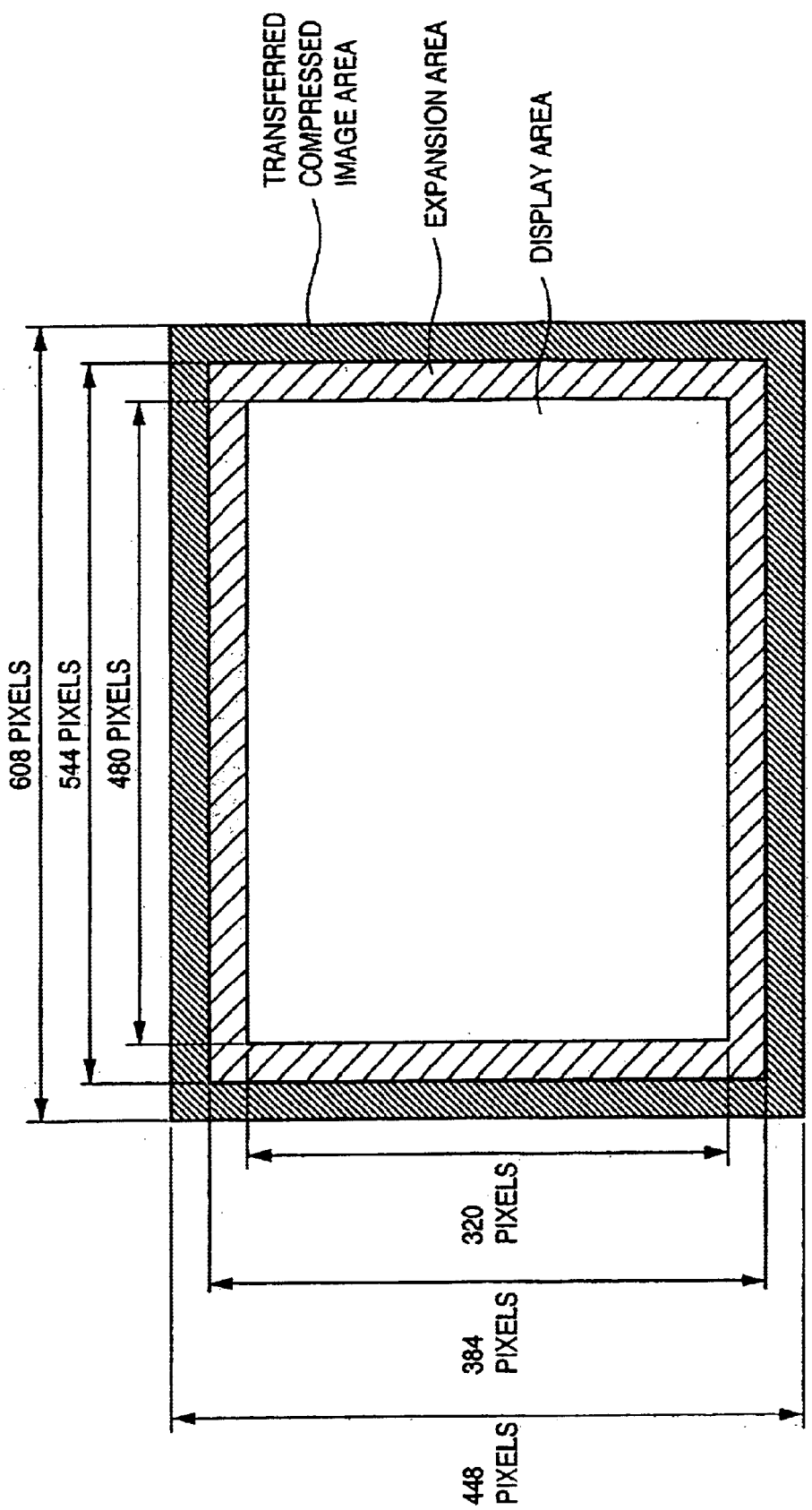
FIG. 8 is an explanatory view of compressed image data to be transferred to a local image memory 59.
Figure 9:
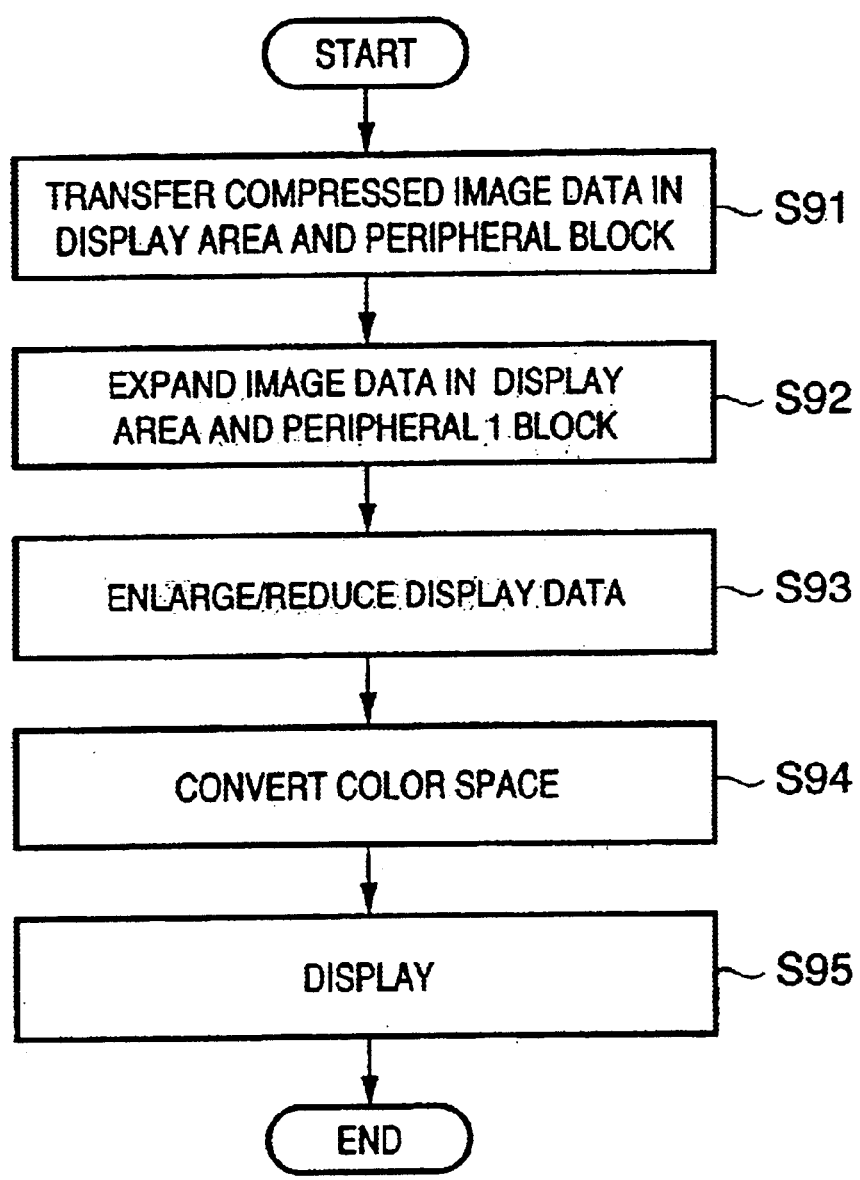
FIG. 9 is a flowchart showing an operation procedure of the image display apparatus in the initial stage of image preview before the start of scroll.

FIG. 8 is an explanatory view of compressed image data to be transferred to a local image memory 59. Further, FIG. 9 is a flowchart showing an operation procedure of the image display apparatus in the initial stage of image preview until the start of scroll. In this example, the initial image displayed on the monitor screen is the central part of image data. In the present invention, upon transfer of compressed image data to the local image memory 59, the compression image data for the necessary blocks, and further, compressed image data for upper/lower/left/right 2 blocks, are transferred to the local image memory 59 (step S91), as shown in FIG. 8. That is, compressed image data for $((480 \div 32+4) \times (600 \div 75) \div 1.0) \times ((320 \div 32+4) \times (600 \div 75) \div 1.0) = 4256$ blocks is stored into the local image memory 59 connected to the preview board 41.

Next, the image expansion unit 60 in the preview board 41 expands image data necessary for display on the monitor screen 56 and data for upper/lower/left/right 1 block, from the data for 4256 blocks stored in the local image memory 59 (step S92). That is, compressed image data for $((480 \div 32+2) \times (600 \div 75) \div 1.0) \times (320 \div 32+2) \times (600 \div 75) \div 1.0) = 3264$ blocks is expanded and stored into a work area in the local image memory 59. As it is predicted that the size of the stored image data must be changed, the stored image data is compressed by the image enlargement/reduction unit 57 to $1/(600 \div 75) \div 1.0 = 1/4$ (step S93). Further, the image data is converted by the color space converter 58 to 8-bit RGB format, then stored into an image buffer area in the local image memory 59 (step S94). The image data is displayed via the monitor I/F 35 on the monitor screen 36 (step S95).

Figure 10:
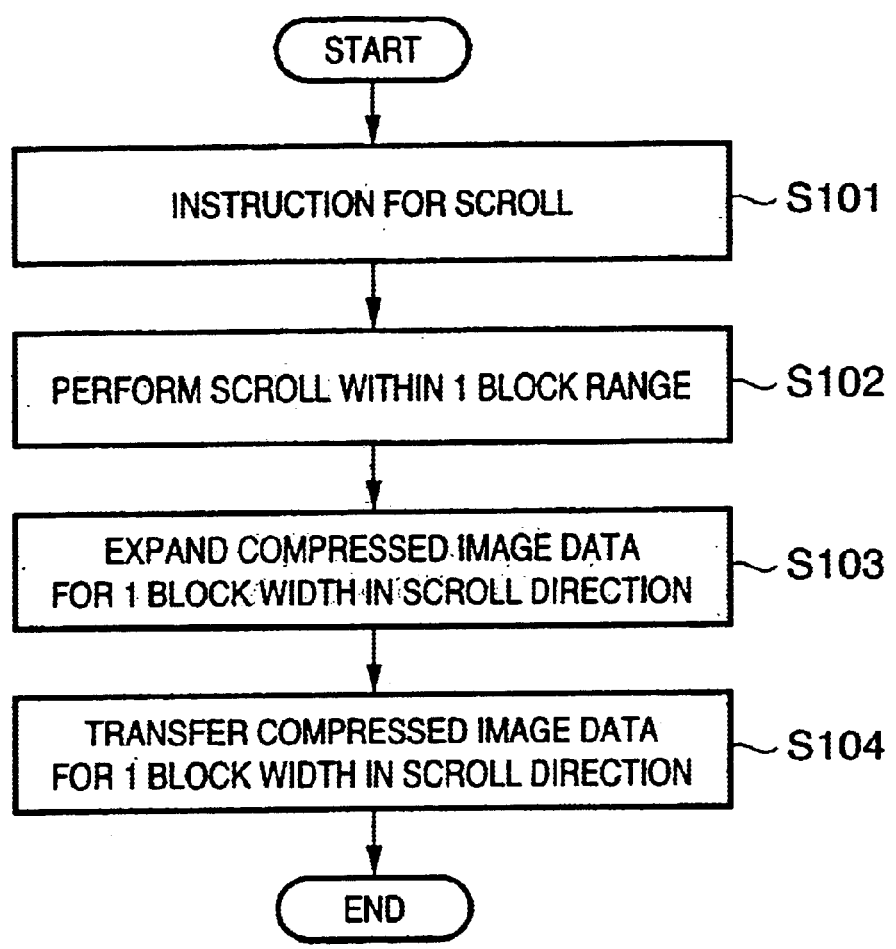
FIG. 10 is a flowchart showing an operation procedure of the image display apparatus for scroll display of image data after an initial image has been displayed on the monitor screen 36.

FIG. 10 is a flowchart showing an operation procedure of the image display apparatus for scroll display of image data after an initial image has been displayed on the monitor screen 36. If an instruction for scroll of image data is inputted from the operation input unit 46 (step S101), scroll is realized by sequential changing an image display area on the monitor screen 56 by display area scroll means installed in the monitor I/F 55 (step S102). In the present embodiment, as the image data for the display image area and image data for upper/lower/left/right 1 block width (32 pixel width) are stored in the image buffer area of the local image memory 59, scroll up to 32 pixels can be smoothly performed in any of upward/downward/leftward/rightward directions.

In the local image memory 59, the image data for further 1 block width is stored in compressed form. In preparation for scroll over 32 pixel width upon designation of scroll in rightward from the operation input unit 46, the image data for 1 block width in the scroll direction is expanded (step S103). Further, at the same time, compressed image data for further 1 block width in the scroll direction (right side) is transferred from the image memory 52 (step S104).

As described above, in the image display method in the image display apparatus according to the present embodiment, first storage means (e.g. image memory 50), second storage means (e.g. local image memory 59) and third storage means (e.g. local image memory 59) are employed for storing image data. From the image data stored in compressed form in the first storage means, partial image data to be displayed on the monitor screen 56 (corresponding to e.g. display area in FIG. 8) is designated. Next, the designated partial data and peripheral data (e.g. expansion area in FIG. 8) of the partial image data are stored in compressed form in the second storage means. Then the compressed partial image data and peripheral data stored in the second storage means are expanded and stored into the third storage means. Then the partial data stored in the third storage means is displayed on the monitor screen 56. If a user designates partial image data to be displayed next, the necessity of peripheral data of the designated partial image data, which is not stored in the second storage means, is predicted. Then the required image data is read from the first storage means and transferred to the second storage means based on the result of prediction.

Further, in the present embodiment, the above peripheral data is divided into first peripheral data on the partial image data side (corresponding to e.g. expansion area in FIG. 8) and second peripheral data on the outer side (corresponding to e.g. transferred compressed image area in FIG. 8). The partial image data and the first peripheral data are expanded and stored in the third storage means. When partial image data to be displayed next is designated, the first peripheral data in compressed form of the designated partial image data, which is not stored in the third storage means, is expanded, and the necessity of the second peripheral data of the designated partial image data, which is not stored in the second storage means, is predicted.

As described above, according to the first embodiment of the present invention, image data is handled as compressed data in block units, and only a part predicted as necessary for next display is stored in the local image memory 59 in compressed form, and only when the necessity of the data is determined, the stored image data is expanded. Accordingly, smooth scroll can be realized and the capacity of local image memory can be reduced.

<Second Embodiment>

In a case where transfer time from the image memory 52 to the local image memory 59 is sufficiently short and fully predicted, scroll display of image data can be sufficiently performed by the above-described procedure. However, in some cases, transfer from the image memory 52 cannot catch up with scroll processing. For example, in the case of apparatus having preview function and printing function, a print operation may be performed via a network or the like during preview processing. In such case, the image memory 52 is used for the print operation and necessary data transfer is interrupted. As a result, the scroll processing cannot be smoothly performed.

In preparation for the above case, it is arranged such that appropriate control is performed in accordance with the status of depression of operation button. For example, if the upward arrow button is depressed for 2 or more seconds and it is determined that scroll is continued in the same direction, compressed image data for 1 block width, positioned further right side of already-transferred compressed image data, is previously transferred, for preparation of smooth scroll operation. Note that in the following description, the depression is made for 2 or more seconds, but the time can be arbitrarily set.

Figure 11:
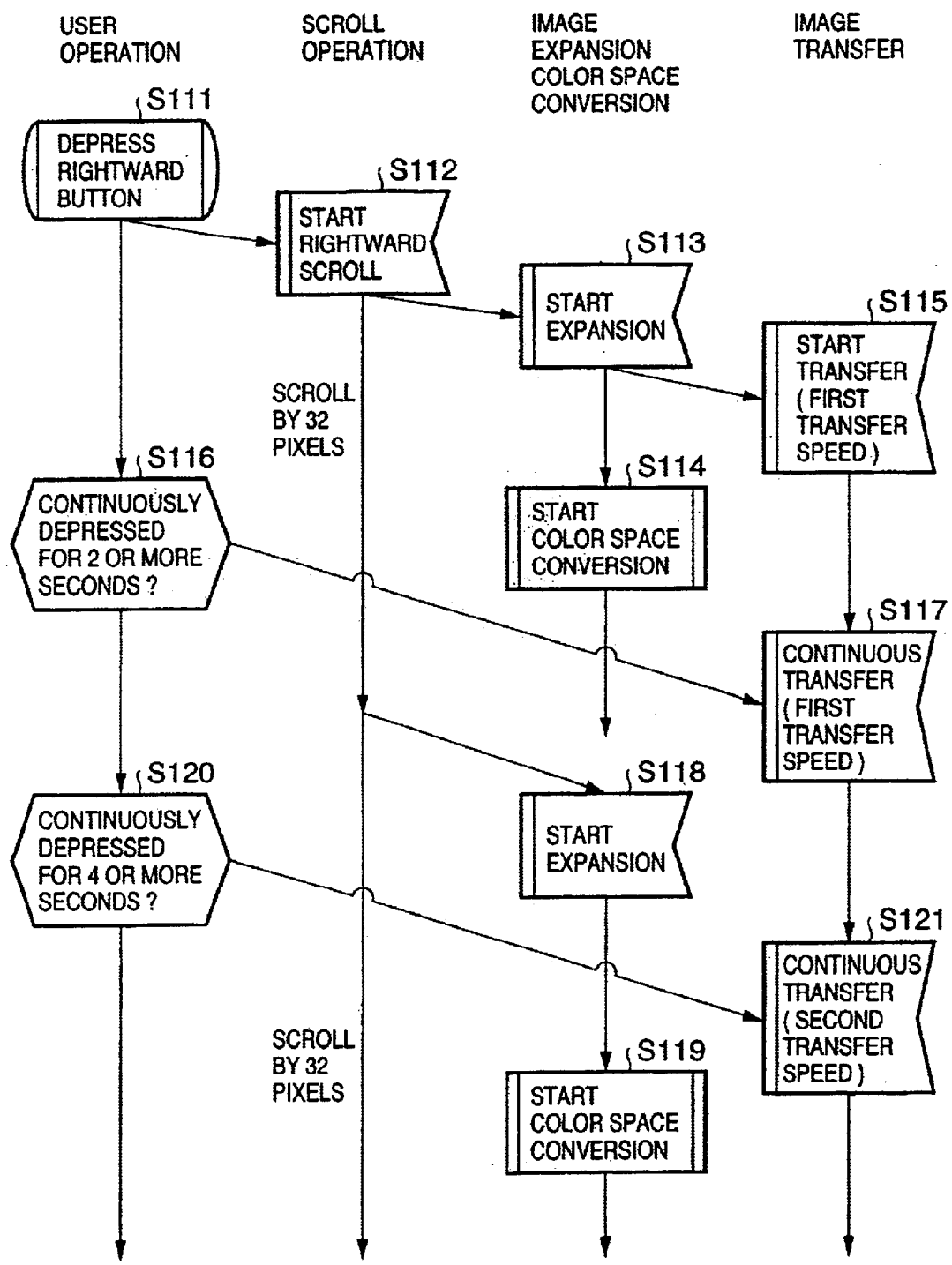
FIG. 11 is a flowchart showing en example of operation procedure of the image display apparatus in a case where the scroll direction of image data is predicted and image data transfer and the like are performed.
Figure 12:
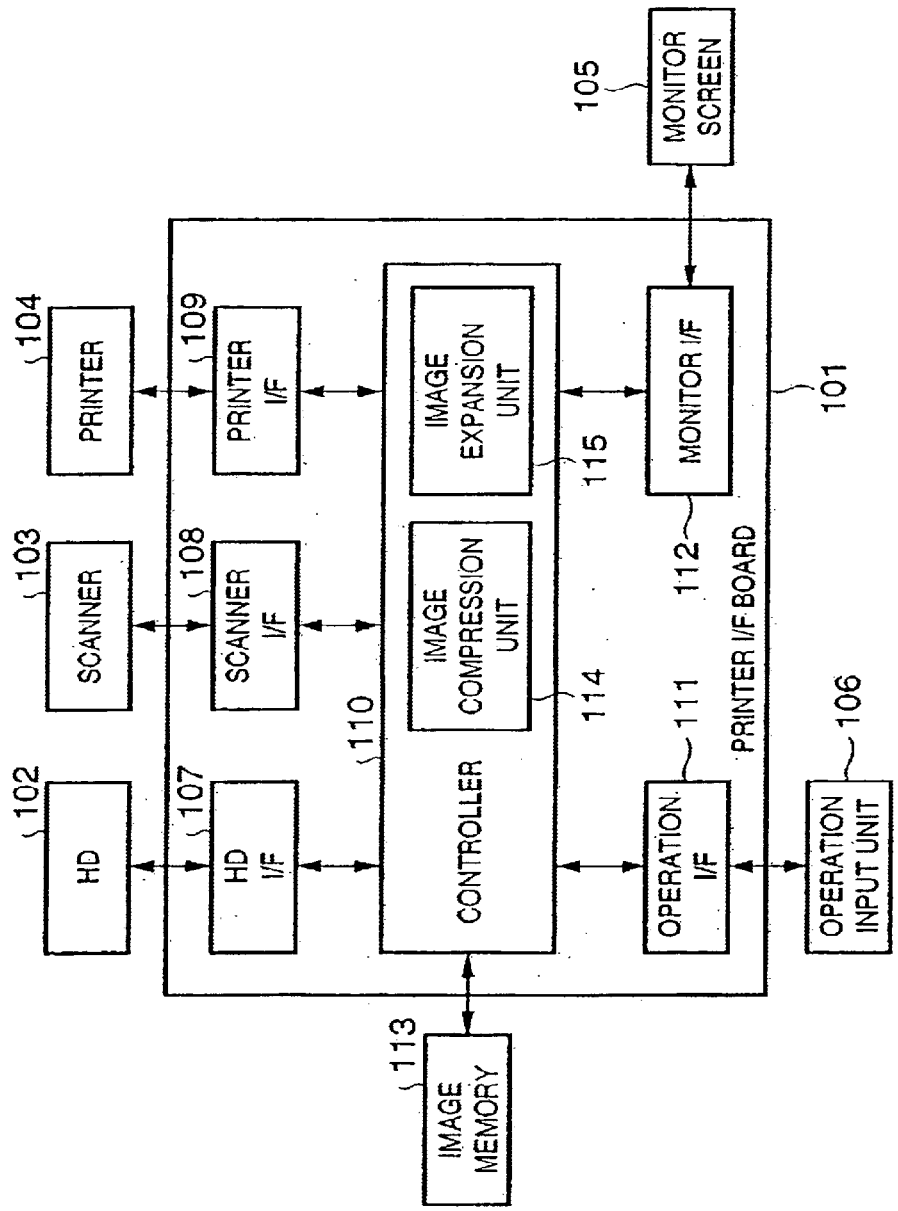
FIG. 12 is a block diagram showing the construction of the conventional image display apparatus having a function of presenting a preview of image data prior to printing.
Figure 13:
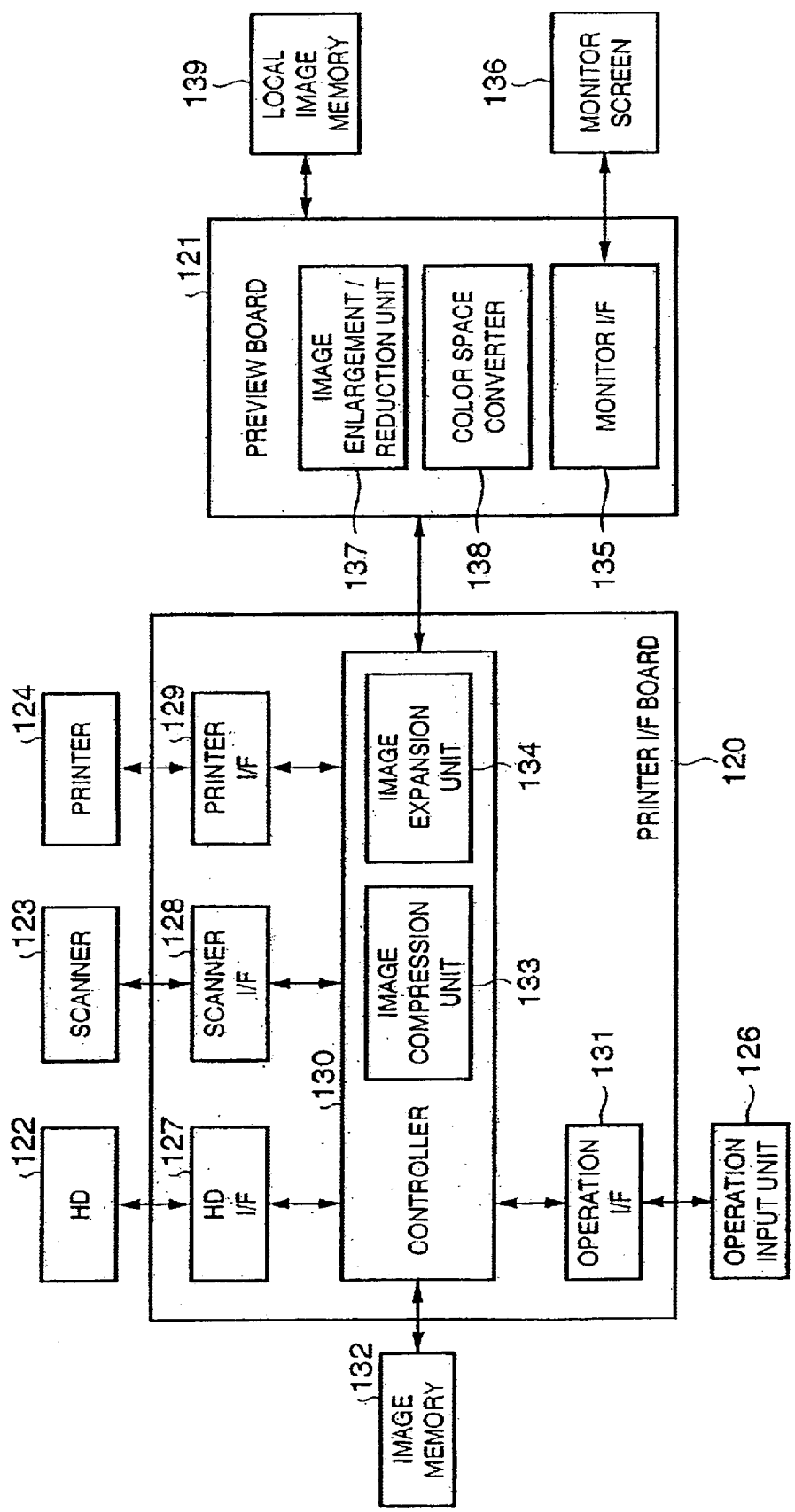
FIG. 13 is a block diagram showing the construction of the conventional image display apparatus having the construction in FIG. 12, to which means for realizing a preview function including an image enlargement/reduction function and a scroll function is connected as another board.

FIG. 11 is a flowchart showing an example of operation procedure of the image display apparatus in a case where the scroll direction of image data is predicted and image data is transferred. First, the user depresses the rightward arrow button of the operation input unit 46 (step S111). By the depression of the button, rightward scroll on the screen is started (step S112). As described above, scroll is performed for the previously-transferred and expanded 1-block data (for 32 pixels), and expansion of the next 1-block data (for 32 pixels) is started (step S113), and color space conversion of the expanded 1-block data is started (step S114). Further, transfer of compressed image data for the next 1 block is started (step S115).

On the other hand, if the same button (rightward button) is depressed for 2 or more seconds (step S116), even if expansion of the previously-transferred compressed image data has not been completed, compressed image data for further 1 block in the direction is transferred (step S117). Note that the transfer speed at this time is referred to as a first transfer speed. Then, expansion of the 1-block (for 32 pixels) image data is started (step S118). Similarly, color space conversion of the expanded 1-block data is started (step S119). Even in this control, as image data is transferred in compressed form, the capacity of the local image memory necessary for transfer is small.

As described above, according to the second embodiment of the present invention, as a scroll direction is predicted based on information from the user interface, and compressed image data is previously transferred in a speculated manner, a continuous scroll operation can be smoothly performed.

<Third Embodiment>

Even in the processing as described in the above second embodiment, as the area for compressed image data and the area for expanded image data correspond to peripheral 1 block width, the range of prior processing is limited. In a case where scroll processing is continuously performed for long time, the amount of image data transferred during the period of processing increases in proportion to time. On the other hand, the possibility that the image memory 52 is used for the above-described print operation increases.

In the present embodiment, in such case, to continuously perform smooth scroll operation, the following processing is performed. That is, in a case where e.g. the rightward button is depressed for longer timer than 2 seconds at step S116, e.g., 4 or more seconds (step S120), it is determined that the necessity of change of transfer speed is predicted, then the transfer speed is changed from the transfer speed by that time (first transfer speed) to a higher transfer speed (second transfer speed), and compressed image data is transferred (step S121).

Figure 14:
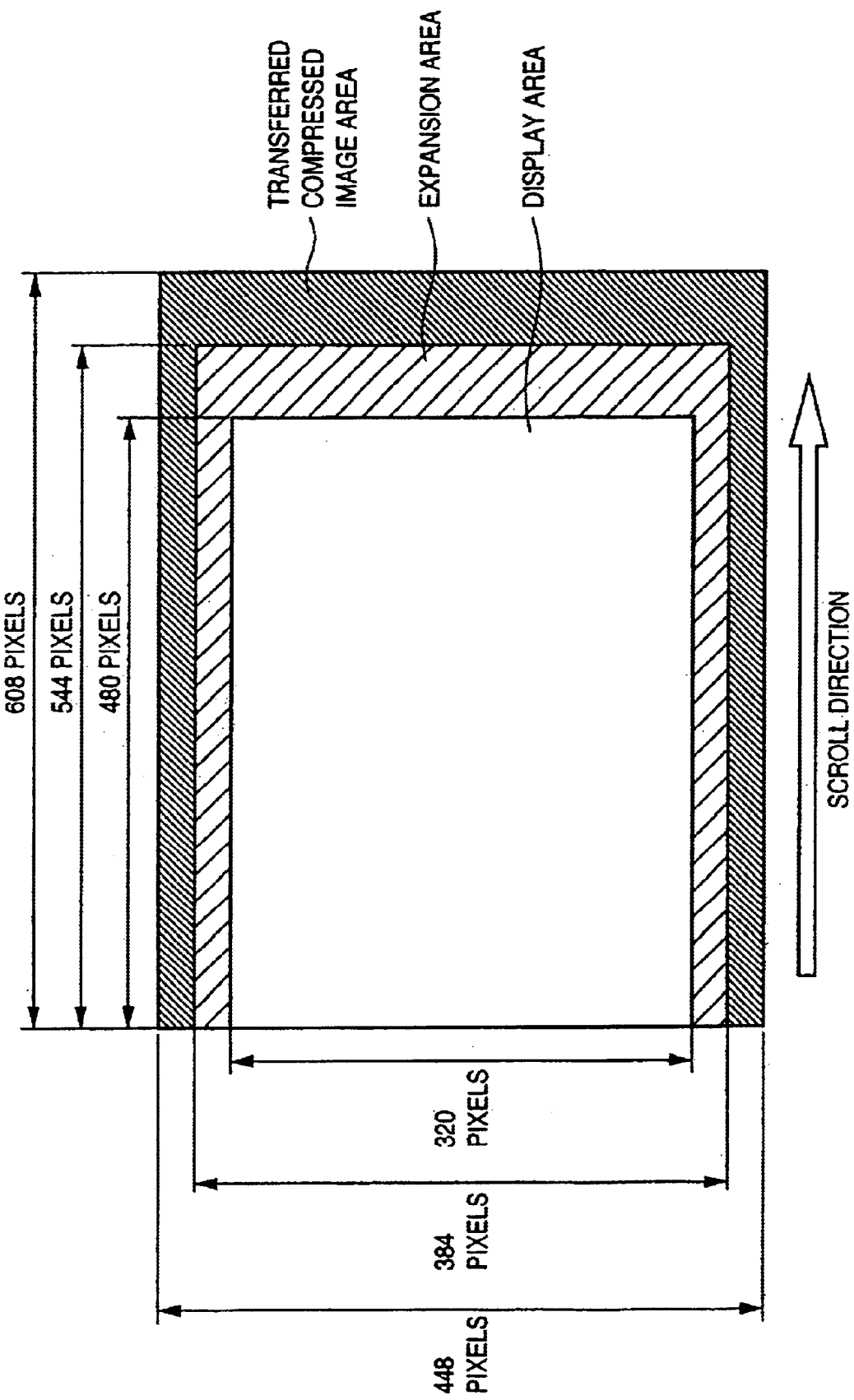
FIG. 14 is an explanatory view of image data to be transferred to the local image memory 59 in a case where it is predicted that scroll is continued for long time.

At the same time, the method of data storage into the local memory is changed from the method as described with reference to FIG. 8 in the first embodiment to a method to be described with reference to FIG. 14. FIG. 14 is an explanatory view of the range of image data to be transferred to the local image memory 59 in a case where it is predicted that scroll is continued for long time. That is, in the present embodiment, data in an expansion area in the opposite direction to scroll, i.e., 1-block data in the transferred compressed image area is omitted, and the amount of data in the expansion area and transferred compressed image area in the scroll direction is increased from 1 block to 2 blocks.

As described above, according to the third embodiment of the present invention, if it is predicted that the scroll operation is performed for longer time based in information from the user interface, the capacity of the compressed image data buffer in the scroll direction is relatively increased without increasing the entire buffer capacity and the data transfer speed for the compressed image data is increased. By this arrangement, even in complicated operation where memory access conflict occurs, smooth scroll processing can be realized. For example, variation of period of preview image data transfer, caused by access to the image memory 52 by another job, can be sufficiently mitigated.

<Other Embodiment>

In the above-described first to third embodiments, the JPEG method is used as image data compression and expansion method, however, similar advantages can be attained by any other arbitrary compression and expansion methods. Further, the image data is divided and compressed in 32×32 pixel units, however, the block size may be arbitrarily set in the horizontal and vertical directions. For example, image data divided into strip-shaped blocks only in the horizontal direction may be handled.

Further, in the above-described embodiments, the scroll function and the like are installed in the printer I/F board and the preview board, however, the function may be installed in another board or installed as one or plural LSIs.

Further, in the above-described embodiments, when compressed image data is transferred to the local image memory 59, compressed image for the required block and compressed image for upper/lower/left/right 2 blocks are transferred to the local image memory 59, however, the number of additional blocks is not limited to 2 but may be arbitrary number.

Further, in the above-described third embodiment, the speed of transfer of image data fro the image memory 52 to the local image memory 59 is set in 2 steps, however, the speed may be variable in arbitrary steps.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a recording medium (or storage medium) holding software program code for realizing the functions of the above-described embodiments to a system or an apparatus, and reading and executing the program code by a computer (e.g., CPU, MPU) of the system or apparatus. In this case, the program code read form the recording medium itself realizes the functions according to the embodiments, and the program product or storage medium constitutes the invention. Furthermore, besides aforesaid functions according to the above embodiment are realized by executing the program code by the computer, the present invention includes a case where an OS (operating system) or the like working on the computer performs a part or entire actual processing in accordance with designations of the program code and realizes the functions according to the above embodiments.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiments.

In a case where the present invention is applied to the aforesaid recording medium, the recording medium stores program code corresponding to the flowcharts described in the embodiments.

As described above, according to the present invention, smooth scroll display and enlargement/reduction display of image data can be realized, and the capacity of local memory for temporarily storing the image data can be reduced, thus cost reduction can be realized.

The present invention is not limited to the above embodiments and various changes and modifications can be made within the spirit and scope of the present invention. Therefore, to appraise the public of the scope of the present invention, the following claims are made.

What is claimed is:

1. An image display apparatus comprising:
   first storage means for storing image data in compressed form;
   first designation means for designating partial image data to be screen-displayed from the image data;
   second storage means for storing the partial image data designated by said first designation means and peripheral data of the partial image data in compressed form;
   expansion means for expanding the partial image data and the peripheral data stored in compressed form in said second storage means;
   third storage means for storing the partial image data and the peripheral data expanded by said expansion means;
   screen-display means for screen-displaying the partial image data stored in said third storage means;
   second designation means for designating the partial image data to be screen-displayed next;
   prediction means for predicting a necessity of required image data, being peripheral data of the partial image data designated by said second designation means, and not stored in said second storage means; and
   transfer means for, in accordance with the result of the prediction by said prediction means, reading the required image data from the image data stored in said first storage means and transferring the image data to said second storage means.

2. An image display apparatus according to claim 1, wherein said second designation means designates the partial image data to be screen-displayed next, within a range of the partial image data and the peripheral data stored in said second storage means.

3. An image display apparatus according to claim 1,
   wherein the peripheral data is divided into first peripheral data on a side of the partial image data and second peripheral data on an outer side,
   wherein said expansion means expands the partial image data and the first peripheral data,
   wherein said third storage means stores the expanded partial image data and the first peripheral data, and
   wherein, when said second designation means designates the partial image data to be screen-displayed next, said expansion means expands the image data in compressed form which is the first peripheral data of the designated partial image data and which is not stored in said third storage means, and said prediction means predicts the necessity of required image data which is the second peripheral data of the designated partial image data and which is not stored in said second storage means.

4. An image display apparatus according to claim 1,
   wherein said prediction means predicts the necessity of the required image data in a stepwise manner,
   wherein if a necessity in a first step is predicted, said transfer means reads the required image data in compressed form from said first storage means and previously transfers the image data to said second storage means, and
   wherein if a necessity in a second step is predicted, said expansion means expands only the image data, determined as necessary, from the previously transferred image data in compressed form.

5. An image display apparatus according to claim 1, wherein an image data transfer speed from said first storage means to said second storage means is variable, and
   wherein a necessity of changing the image data transfer speed is predicted by said prediction means, said apparatus further comprises speed change means for changing the image data transfer speed.

6. An image display apparatus according to claim 1, wherein a size of the screen-displayed partial image data is variable, and wherein if a necessity of changing the size of the partial image data is predicted by said prediction means, said apparatus further comprises size change means for changing the size of the partial image data.

7. An image display apparatus according to claim 1, wherein the image data is dividable into plural blocks, and compressed or expanded by block.

8. An image display apparatus according to claim 1, wherein the partial image data is screen-displayed by scroll-displaying the image data stored in said first storage means, and wherein said second designation means designates the partial image data to be screen-displayed next by designating a scroll direction of the image data.

9. An image display method using first storage means, second storage means and third storage means for storing image data, said method comprising the steps of:

designating partial image data to be screen-displayed from the image data stored in the first storage means in compressed form;

storing the designated partial image data and peripheral data of the partial image data into the second storage means in compressed form;

expanding the partial image data and the peripheral data stored in the second storage means in compressed form;

storing the expanded partial image data and the peripheral data into the third storage means;

screen-displaying the partial image data stored in the third storage means;

designating partial image data to be screen-displayed next;

predicting a necessity of required image data, being peripheral data of the designated partial image data, and not stored in the second storage means; and reading the required image data from the image data stored in the first storage means and transferring the required image data to the second storage means in accordance with a prediction result in said predicting step.

10. An image display method according to claim 9, wherein the partial image data to be screen-displayed next is designated within a range of the partial image data and the peripheral data stored in the second storage means.

11. An image display method according to claim 9, wherein the peripheral data is divided into first peripheral data on a side of the partial image data and second peripheral data on an outer side, wherein the partial image data and the first peripheral data are expanded, wherein the expanded partial image data and the first peripheral data are stored in the third storage means, wherein, when the partial image data to be screen-displayed next is designated, image data in compressed form, which is the first peripheral data of the designated partial image data and which is not stored in the third storage means, is expanded, and wherein a necessity of required image data which is the second peripheral data of the designated partial image and which is not stored in the second storage means is predicted.

12. An image display method according to claim 9, wherein the necessity of the required image data is predicted in a stepwise manner, wherein if a necessity in a first step is predicted, the required image data in compressed form is read from the first storage means and previously transferred to the second storage means, and wherein if a necessity in a second step is predicted, only image data determined as necessary, from the image data in compressed form previously transferred, is expanded.

13. An image display method according to claim 9, wherein an image data transfer speed from the first storage means to the second storage means is variable, and wherein if a necessity of changing the image data transfer speed is predicted, the image data transfer speed is changed.

14. An image display method according to claim 9, wherein a size of said screen-displayed partial image data is variable, and wherein if necessity of changing the size of the partial image data is predicted, the size of the partial image data is changed.

15. An image display method according to claim 9, wherein the image data is dividable into plural blocks, and compressed or expanded by block.

16. An image display method according to claim 9, wherein the partial image data is screen-displayed by scroll-displaying the image data stored in the first storage means, and wherein the partial image data to be screen-played next is designated by designating a scroll direction of the image data.

17. A program for a computer having first storage means, second storage means and third storage means for storing image data, for executing an image display method, said program comprising code for:

designating partial image data to be screen-displayed from the image data stored in the first storage means in compressed form;

storing the designated partial image data and peripheral data of the image data into the second storage means in compressed form;

expanding the partial image data and the peripheral data stored in the second storage means in compressed form;

storing the expanded partial image data and the peripheral data into the third storage means;

screen-displaying the partial image data stored in the third storage means;

designating partial image data to be screen-displayed next;

predicting a necessity of required image data, being peripheral data of the designated partial image data, and not stored in said second storage means; and reading the required image data from the image data stored in the first storage means and transferring the required image data to the second storage means in accordance with a prediction result form said predicting code.

18. A computer-readable recording medium storing the program according to claim 17.

* * * * *

UNITED STATES PATENT AND TRADEMARK OFFICE
CERTIFICATE OF CORRECTION

PATENT NO. : 6,909,433 B2
DATED : June 21, 2005
INVENTOR(S) : Toshiaki Minami

It is certified that error appears in the above-identified patent and that said Letters Patent is hereby corrected as shown below:

<u>Title page,</u>
Item [57], ABSTRACT,
Line 10, "in" should read -- In --.

<u>Column 3,</u>
Line 6, "its" should read -- as its --.

<u>Column 4,</u>
Line 25, "en" should read -- an --.

<u>Column 8,</u>
Line 23, "long" should read -- a long --.
Line 30, "timer" should be deleted.

<u>Column 12,</u>
Line 32, "screen-played" should read -- screen-displayed --.
Line 61, "form" should read -- from --.

Signed and Sealed this

Sixth Day of December, 2005

JON W. DUDAS
*Director of the United States Patent and Trademark Office*